(12) United States Patent
Kolb et al.

(10) Patent No.: US 12,055,171 B2
(45) Date of Patent: Aug. 6, 2024

(54) LOCK FOR HOLDING A FIRST PART TO A SECOND PART AND ASSEMBLY OF A FIRST PART AND A SECOND PART

(71) Applicant: A. RAYMOND ET CIE, Grenoble (FR)

(72) Inventors: Christian Kolb, Binzen (DE); Alexander Ruff, Weil am Rhein (DE); Daniel Schreiyäck, Weil am Rhein-Ötlingen (DE)

(73) Assignee: A. RAYMOND ET CIE, Grenoble (FR)

( * ) Notice: Subject to any disclaimer, the term of this patent is extended or adjusted under 35 U.S.C. 154(b) by 130 days.

(21) Appl. No.: 17/709,863

(22) Filed: Mar. 31, 2022

(65) Prior Publication Data
US 2022/0316505 A1 Oct. 6, 2022

(30) Foreign Application Priority Data

Apr. 1, 2021 (EP) ..................... 21166515

(51) Int. Cl.
*F16B 2/06* (2006.01)
*E05C 1/10* (2006.01)
(Continued)

(52) U.S. Cl.
CPC .................. *F16B 2/06* (2013.01); *E05C 1/10* (2013.01); *E05C 19/02* (2013.01); *E05C 19/08* (2013.01); *E05C 19/10* (2013.01); *B60N 2/0155* (2013.01)

(58) Field of Classification Search
CPC ... F16B 2/06; E05C 1/10; E05C 19/02; E05C 19/08; E05C 19/10; B60N 2/0155
See application file for complete search history.

(56) References Cited

U.S. PATENT DOCUMENTS 4,916,778 A * 4/1990 Iguchi .................. F16B 21/076
24/457
5,890,831 A * 4/1999 Kato ...................... B60N 2/015
403/329
(Continued)

FOREIGN PATENT DOCUMENTS

| CN | 104512280 B | 8/2017 |
| CN | 107487232 B | 2/2020 |
| KR | 101403858 B1 | 6/2014 |

OTHER PUBLICATIONS

Machine assisted English translation of KR101403858B1 obtained from https://patents.google.com/patent on Mar. 30, 2022, 5 pages.
(Continued)

*Primary Examiner* — Mark A Williams
(74) *Attorney, Agent, or Firm* — Warner Norcross + Judd LLP

(57) ABSTRACT

A lock for holding a first part to a second part comprises a holding body with a receptacle for receiving a protruding part of the second part. The holding body has a wall that borders the receptacle and a locking element, the locking element having a protrusion, whereby the locking element has a first position, whereby in the first position the protrusion is in a locking position, whereby in the locking position the protrusion protrudes from the wall into the receptacle by a first amount and the locking element has a second position, whereby in the second position the protrusion is in a release position, whereby in the release position the protrusion either protrudes from the wall into the receptacle by a second amount, whereby the second amount is smaller than the first amount, or the protrusion does not protrude from the wall.

10 Claims, 5 Drawing Sheets

(51) Int. Cl.
*E05C 19/02* (2006.01)
*E05C 19/08* (2006.01)
*E05C 19/10* (2006.01)
*B60N 2/015* (2006.01)

(56) References Cited

U.S. PATENT DOCUMENTS

| | | | |
|---|---|---|---|
| 6,565,164 B2* | 5/2003 | Irwin | A47L 15/4259 |
| | | | 312/228 |
| 7,740,432 B2* | 6/2010 | Harada | F16B 21/065 |
| | | | 24/297 |
| 8,780,797 B2 | 7/2014 | Chen et al. | |
| 9,150,120 B2* | 10/2015 | Antoine | F16B 21/075 |
| 10,288,098 B2* | 5/2019 | Meyers | B60R 13/0206 |
| 10,408,248 B1* | 9/2019 | Safry | F16B 21/086 |
| 10,968,931 B1* | 4/2021 | Forti | F16B 5/0664 |
| 11,078,944 B2* | 8/2021 | Lepper | F16B 21/073 |
| 11,149,774 B2* | 10/2021 | Malek | F16B 5/065 |
| 2002/0050551 A1* | 5/2002 | Yamada | B60N 2/01508 |
| | | | 248/500 |
| 2011/0260474 A1* | 10/2011 | Sambommatsu | E05C 19/022 |
| | | | 292/178 |
| 2015/0321622 A1* | 11/2015 | Dickinson | F16B 5/065 |
| | | | 24/458 |

OTHER PUBLICATIONS

Machine assisted English translation of CN104512280B obtained from https://patents.google.com/patent on Mar. 30, 2022, 7 pages.
Machine assisted English translation of CN107487232B obtained from https://patents.google.com/patent on Mar. 30, 2022, 6 pages.

* cited by examiner

LOCK FOR HOLDING A FIRST PART TO A SECOND PART AND ASSEMBLY OF A FIRST PART AND A SECOND PART

CROSS-REFERENCE TO RELATED APPLICATIONS

This application claims priority to and all advantages of European Patent Application No. 21166515.3, filed on 1 Apr. 2021, the contents of which are hereby incorporated by reference.

FIELD OF THE INVENTION

The invention pertains to a lock for holding a first part to a second part. The invention also pertains to an assembly of a first part and a second part. The invention also pertains to a method for disassembly of such an assembly.

BACKGROUND OF THE INVENTION

From CN 107487232 BB a lock for holding a first part to a second part is known. The lock comprises a holding body that has a receptacle for receiving a protruding part of the second part. The holding body has a wall that borders the receptacle. The lock also has a locking element that can be slidably arranged in the holding body. The locking element has a protrusion, whereby the locking element has a first position, whereby in the first position the protrusion protrudes from the wall into the receptacle by a first amount (locking position), and the locking element has a second position, whereby in the second position the protrusion protrudes from the wall into the receptacle by a second amount, whereby the second amount is smaller than the first amount, or whereby in the second position the protrusion does not protrude from the wall (release position). The protrusion can be moved from the first position to the second position in a retraction direction relative to the holding body.

A lock for holding a first part to a second part is also known from U.S. Pat. No. 8,780,797. A lock for holding a first part to a second part is also known from CN104512280. A lock for holding a first part a second part is also known from KR 101403858 B1.

Given this background, the problem to be solved by the invention is to provide a lock for holding a first part to a second part that can be handled more easily by a worker.

BRIEF SUMMARY OF THE INVENTION

Disclosed is a lock for holding a first part to a second part, the lock comprising:
a holding body with a receptacle for receiving a protruding part of the second part, the holding body having a wall that borders the receptacle,
a locking element, the locking element having a protrusion, wherein the locking element has a first position, whereby in the first position the protrusion is in a locking position, whereby in the locking position the protrusion protrudes from the wall into the receptacle by a first amount, and the locking element has a second position, whereby in the second position the protrusion is in a release position, whereby in the release position:
the protrusion either protrudes from the wall into the receptacle by a second amount, whereby the second amount is smaller than the first amount, or
the protrusion does not protrude from the wall,
wherein the protrusion can be moved from the locking position to the release position in a retraction direction relative to the holding body, and
a lever, whereby
the lever has a first end and a second end that is arranged opposite the first end, whereby the protrusion is attached to the first end of the lever, and the lever is or can be moved into a position, where the lever rests against a protrusion of the holding body at a point of contact, and when in contact with the protrusion the lever can be swiveled about the protrusion or the lever is connected to the holding body by a rotational joint, whereby the point of contact or the rotational joint is arranged between the first end and the second end of the lever, and applying a force to the second end that is directed against the retraction direction leads to: a swivel movement of the lever about the protrusion or in the rotational joint, and a movement of the protrusion in the retraction direction.

The basic concept of the lock according to the invention is to have the retraction direction to be the opposite direction of a pushing direction, with which the locking element can be moved. For example in CN 107487232 a push onto the locking element leads for the protrusion to move in the same direction as the pushing direction. Here the retraction direction would be the same direction as the pushing direction. That means, however, that space needs to be provided at the opposite end of the holding body in order to allow the protrusion to move at least partially out of the receptacle when the locking element is pushed. The basic concept of the invention, however, is to have the retraction direction of the protrusion to be the opposite direction of a pushing movement of the locking element.

This basic concept of the invention is implemented by providing the lock according to the invention with at least one lever. According to the invention the lever has a first end and a second end that is arranged opposite the first end, whereby the protrusion is attached to the first end of the lever. According to the invention the lever is in a position or can be moved into a position, where the lever rests against a protruding piece of the holding body at a point of contact. When the lever is in contact with the protruding piece, the lever can be swiveled about the protruding piece. In an alternative to the lever being or being able to be moved into a position, whether the lever rests against a protruding piece of the holding body at a point of contact, and when in contact with the protruding piece can be swiveled about the protruding piece, the lever is connected to the holding body by a rotational joint.

In the embodiment, where the lever is or can be moved into a position, where the lever rests against a protruding piece of the holding body at a point of contact, and when in contact with the protruding piece can be swiveled about the protruding piece, the point of contact is arranged between the first end and the second end of the lever. In the embodiment, where the lever is connected to the holding body by a rotational joint, the rotational joint is arranged between the first end and the second end of the lever.

According to the invention, applying a force to the second end that is directed against the retraction direction leads to a swivel movement of the lever about the protruding piece or in the rotational joint. This leads to a movement of the protrusion in the retraction direction. It can be said that providing the lever allows the application of force to the second end of the lever to be translated into a movement of the protrusion in the opposite direction. Pushing the locking element in leads to the protrusion being pulled towards the point of application of the force.

The lock has a holding body with a receptacle for receiving a protruding part of the second part. A holding body can be an individual body that can be attached to the first part. A holding body can, for example be made by injection moulding. A holding body can, however, also be made as one part of the first part.

The holding body has a wall that borders the receptacle. The holding body can have more than one wall that borders the receptacle. For example if the receptacle has a rectangular cross-section, the holding body will have a first wall, a second wall, a third wall, a fourth wall that each border the receptacle and between them give the receptacle its rectangular shape. In a preferred embodiment, the receptacle has a bottom wall. The receptacle preferably is made like a cul-de-sac having one opening that allows the protruding part of the second part to be inserted the remainder of the receptacle being delineated by the walls. The bottom wall can be used as a limitation to pushing the protruding part of the second part into the receptacle. The protruding part of the second part can only be pushed into the receptacle until the tip of the protruding part contacts the bottom wall of the receptacle. However, designs are also feasible, where the receptacle has no bottom wall. Designs are also feasible, where the walls of the holding body that border the receptacle have openings. The walls that border the receptacle can also be more of the style of a frame. The holding body is said in claim 1 to have a wall that borders the receptacle in order to define the reference plane within the holding body relative to which reference plane the position of the protrusion of the locking element for the locking position and the release position can be described.

The wall that borders the receptacle may have a hole and the locking element may protrude through the hole into the receptacle.

In a preferred embodiment, the holding body has a first wall that borders the receptacle, whereby in the locking position the protrusion protrudes from the first wall into the receptacle by a first amount and whereby in the release position
- the protrusion either protrudes from the first wall into the receptacle by a second amount, whereby the second amount is smaller than the first amount,
- or the protrusion does not protrude from the first wall, whereby in this preferred embodiment the holding body has a second wall that borders the receptacle, whereby the second wall is arranged opposite the first wall and whereby the second wall has a hole or a recess, whereby the protrusion has a tip, whereby the protrusion can be brought into a position, where the tip of the protrusion engages the hole or recess in the second wall. In a first alternative, the tip of the protrusion engages the hole or recess in the second wall when the protrusion is in the locking position. In a second alternative, the tip of the protrusion engages the hole or recess in the second wall in a forward position, whereby in the forward position the protrusion protrudes from the first wall into the receptacle by an amount that is larger than the first amount.

In a preferred embodiment, the recess is provided by way of a section of the second wall protruding towards the first wall over other sections of the second wall.

The lock according to the invention has a locking element. The purpose of the locking element is to hold the protruding part of the second part in the receptacle, once the protruding part of the second part has been introduced into the receptacle. For this purpose, the locking element has a protrusion.

The locking element has a first position, whereby in the first position the protrusion protrudes from the wall into the receptacle by a first amount. This position of the protrusion is called the locking position. The locking element also has a second position, whereby when the locking element is in the second position, the protrusion protrudes from the wall into the receptacle by a second amount, whereby the second amount is smaller than the first amount or as an alternative the protrusion does not protrude from the wall into the receptacle at all when the locking element is in the second position. The position of the protrusion when the locking element is in the second position is called the release position.

The form and shape of the protrusion can be chosen in dependence of the form and shape of the protruding part of the second part that is received in the receptacle. According to the invention, it is intended, that the protrusion in the locking position blocks the protruding part of the second part from being retracted from the receptacle, while the protrusion in the release position allows the protruding part of the second part to be retracted from the receptacle.

According to the invention, the protrusion can be moved from the locking position to the release position in a retraction direction relative to the holding body. In a preferred embodiment, the retraction direction is a linear direction. Designs are, however, also feasible, where the retraction direction is a circumferential direction of a rotational movement.

In a preferred embodiment, the lever is a longitudinal element. A longitudinal element is understood to be an element, which has a length, a height and a width, whereby the maximum length is larger by a factor of at least two, preferably by a factor of at least three, more preferably by a factor of at least four than the maximum width and/or the maximum height of the element. In a preferred embodiment, the lever is a solid element and acts like a bar.

According to the invention the lever has a first end and a second and that is arranged opposite the first end, whereby the protrusion is attached to the first end of the lever. The protrusion can be directly and rigidly attached to the first end of the lever. This would mean that the protrusion would follow in its movement the path of movement of the first end. In an alternative embodiment, the protrusion is attached to the first end by way of a hinge or rotational joint. Such an embodiment would allow the first end of the lever to swivel about the protruding piece of the holding body or swivel in the rotational joint while the protrusion of the locking element is allowed to follow a linear movement.

In a first alternative of the invention, the lever is or can be moved into a position, where the lever rests against a protruding piece of the holding body at a point of contact, whereby when the lever is in contact with the protruding piece of the holding body the lever can be swiveled about the protruding piece. The point of contact is arranged between the first end and the second end of the lever. In this alternative, it is feasible that the locking element in one of its possible positions may lead to the lever being at a distance from the protruding piece of the holding body. In such an embodiment, the lever would first be moved into a position, where the lever rests against a protruding piece of the holding body at a point of contact, before the lever is made to swivel. In an alternative, the lever is arranged in the lock according to the invention in such a manner that it is already in a position, where the lever rests against a protruding piece of the holding body.

In an alternative of the invention, the lever is connected to the holding body by a rotational joint, whereby the rotational joint is arranged between the first end and the second end.

According to the invention the applying of force to the second end of the lever that is directed against the retraction direction leads to a swivel movement of the lever about the protruding piece or in the rotational joint and leads to a movement of the protrusion in the retraction direction. By introducing the lever, the invention provides the possibility of applying a force in one direction (for example a pushing force onto the locking element) that by way of the lever swiveling about the point of contact or in the rotational joint is translated into a movement of the protrusion of the locking element into the opposite direction.

The advantages of the invention can already be obtained by a lock that only has one lever. In a preferred embodiment, the lock, however, has a second lever, whereby the second lever has a first end and a second end that is arranged opposite the first end, whereby the protrusion is attached to the first end of the lever and the first end of the second lever and the second lever is or can be moved into a position, where the second lever rests against a second protruding piece of the holding body at a point of contact, and when in contact with the second protruding piece can be swiveled about the second protruding piece or the second lever is connected to the holding body by a second rotational joint, whereby the point of contact or the second rotational joint is arranged between the first end and the second end of the second lever and applying a force to the second end of the second lever that is directed against the retraction direction leads to a swivel movement of the second lever about the second protruding piece or in the second rotational joint a movement of the protrusion in the retraction direction.

Providing a second lever in addition to the first lever provides the possibility of applying forces to the protrusion of the locking element in a more symmetric fashion.

In a preferred embodiment, a bridge is provided that connects the second end of the lever with the second end of the second lever. This bridge can, for example, function as a point of application of force. Applying a force to the bridge can lead to a simultaneous application of forces to the second end of the lever and the second end of the second lever. The bridge can, for example, be designed as a place of contact for a finger, preferably a thumb of a worker and facilitates the operation of the lock according to the invention by the worker. In a preferred embodiment a second end of the lever is connected to the bridge by way of a hinge. In a preferred embodiment, the second end of the second lever is connected to the bridge by a hinge. Connecting the lever/the second lever to the bridge by way of a hinge allows for the bridge to be moved in a linear direction while the lever/the second lever is allowed to swivel.

In a preferred embodiment a guide surface is provided, whereby a surface of the protrusion of the locking element and/or a surface of a part of the locking element that is fixedly connected to the protrusion interacts with the guide surface such that the protrusion is guided to move from the first position to the second position in a retraction direction. In a preferred embodiment, the guide surface is a plane surface and the retraction direction is a linear direction.

In a preferred embodiment, a locking protrusion is arranged at the second end of the lever, whereby the locking protrusion can be releasably engaged with a part of the holding body to hold the lever in a predetermined swivel position. The engagement of the locking protrusion with a part of the holding body can for example be used to hold the lever in that predetermined swivel position that leads to the protrusion of the locking element being in the release position. The locking element hence would "snap" to this position and the protrusion of the locking element would be held in the release position. This would facilitate the retrieving of the protruding part of the second part from the receptacle. The worker would not need to hold the locking element in a predetermined position (that position of the locking element that leads to the release position of the protrusion of the locking element) while at the same time trying to retreat the protruding part of the second part from the receptacle. For retrieving the protruding part of the second part from the receptacle, the worker could "snap" the locking protrusion at the second end of the lever into engagement with the part of the holding body that holds the lever in the predetermined swivel position that leads to the protrusion of the locking element to be in the release position. If the locking element is snapped into this position, the protrusion of the holding body is held in the release position and the worker can easily retract the protruding part of the second part from the receptacle.

In a preferred embodiment, a guide arm is arranged at the second end of the lever, whereby the guide arm is arranged in a channel in the holding body and can be moved along the channel, thereby guiding the movement of the second end of the lever. The guide arm can be the same physical element as the physical element that provides the locking protrusion at the second end of the lever.

In a preferred embodiment, the second end of the lever is connected to the locking protrusion and/or the guide arm by a hinge.

In a preferred embodiment, the holding body is made of plastic material. In a preferred embodiment, the holding body is made by way of injection moulding. In a preferred embodiment, the locking element is made of plastic material. In a preferred embodiment, the locking element is made by way of injection moulding. The locking element could, for example, also be made by way of stamping from a blank In a preferred embodiment the holding body and/or the locking element and most preferably the entire lock is designed to be mirror-symmetrical about a plane that dissects the protrusion and include the retraction direction.

In a preferred embodiment the protruding part of the second part is introduced into the receptacle along a linear insertion direction. In a preferred embodiment the retraction direction is a linear retraction direction and the linear insertion direction is perpendicular to a linear retraction direction.

In a preferred embodiment the holding body and/or the locking element and most preferably the entire lock is designed to be mirror-symmetrical about a plane that includes the retraction direction and the linear insertion direction. In a preferred embodiment, the lever would be arranged on one side of this plane and the second lever would be arranged on the opposite side of this plane. In a preferred embodiment, the bridge would lead through this plane.

In a preferred embodiment, the protrusion of the locking element is designed to be wedge shaped. In a preferred embodiment, the protrusion of the locking element has a tip. The wedge shaped protrusion of the locking element in a preferred embodiment has its slimmest portion at the tip and then increases in thickness further away from the tip. The wedge shaped protrusion can have a push back surface at its underside that can come into contact with the protruding part as the protruding part is moved upwards and if the protrusion is in the release position or close to the release position. If for example the protrusion has been moved from the locking position towards the release position and has either reached the release position or is close to the release position and in this position is in the way of the protruding element, the push back surface of the protrusion can lead to the protruding part pushing the protrusion further into the release direction when the protruding part contacts the push back surface of the wedge shaped protrusion.

In a preferred embodiment, the protrusion can have a pull out surface at its underside that is pointing towards the wall and is arranged at an angle to the release direction, whereby the pull out surface can come into contact with the protruding part as the protruding part is moved upwards and if the protrusion is in the locking position or close to the locking position. If for example the protrusion is in the locking position or close to the locking position and in this position is in the way of the protruding element, the pull out surface can lead to the protruding part pulling the protrusion further away from the wall and against the release direction when the protruding part contacts the pull out surface. Such an arrangement can be used, for example to bring the tip of the protrusion into contact with a hole or a recess in a second wall of the receptacle. This arrangement can secure the protruding part in the receptacle. The more the protruding part is tried to be pulled out of the receptacle, the more the protrusion is pulled out and prevents the protruding part from being pulled out of the receptacle.

In a preferred embodiment, the locking element has a spring.

In a preferred embodiment, the spring is loaded when the locking element is in the second position. The loading of the spring pretensions the locking element to move from the second position into the first position. In a preferred embodiment, a first spring is provided at the bridge. The first spring has a free end. The free end is arranged to come into contact with the holding body or into contact with the lever as the locking element is moved from the first position to the second position and is pretensioned by way of the relative movement between the locking element and the holding body or the lever. In the cause of this movement the free end of the spring contacts the holding body or the lever, but as the locking element is further moved into the direction of the second position the free end is held back by its contact to the holding body or the lever and hence moved towards the opposite end of the spring and thereby pretensioning the spring.

In a preferred embodiment, a spring is provided at the lever. The spring has a free end. The free end is arranged to come into contact with the holding body as the locking element is moved from the first position to the second position and is pretensioned by way of the relative movement between the locking element and the holding body. In the cause of this movement the free end of the spring contacts the holding body, but as the locking element is further moved into the direction of the second position the free end is held back by its contact to the holding body and hence moved towards the opposite end of the spring and thereby pretensioning the spring.

In a preferred embodiment, the lever is a part of the locking element. In a preferred embodiment, the protrusion, the lever, the second lever, the bridge, and—if present—the locking protrusion of the lever, the guide arm of the lever, the locking protrusion of the second lever and the guide arm of the second lever are all part of the locking element and made as one piece, for example by way of injection moulding or by way of stamping from a blank.

In the cause of this description, hinges are described to connect one element to another, for example the first end of the lever to the protrusion or for example the second end of the lever to the bridge, the locking protrusion and/or the guide arm. In a preferred embodiment these hinges are flexible hinges that allow some additional longitudinal movement between the pieces. The hinges might for example be film hinges.

The assembly according to the invention has a first part and a second part whereby the first part is connected to the holding body of the lock (which is to be understood to include those embodiments where the holding body is an element of the first part) and whereby the second part comprises a protruding part with an opening or a recess, protruding part is arranged in the receptacle and wherein the protrusion of the locking element is in the locking position and at least partially arranged inside the protruding part.

In a preferred embodiment, the protruding part is an U-shaped protruding part. In a preferred embodiment the protruding part can be a part of a hook. In a preferred embodiment the protruding part can have wedged portion at its end, the wedged portion forming a tip of the protruding part and whereby the protruding part has a recess at the end of the wedged portion, the recess preferably being designed as a step after the wedged portion.

In a preferred embodiment the protruding part is a wire. In an alternative embodiment, the protruding part is a piece stamped out from a metal sheet.

In a preferred embodiment, the first part is a part of a vehicle, for example the cushion of the backbench of a vehicle. In a preferred embodiment, the second part of the assembly is a part of a vehicle, for example a frame or a floor or a wall of the vehicle. In a preferred embodiment, the lock according to the invention is used to attach the part of the upholstering, especially a cushion of a backbench of a car to the body of the car.

The method for disassembly of an assembly according to the invention is characterized in that a force is applied to the second end of the lever that is directed against the retraction direction, which application of force leads to a swivel movement of the lever about the protruding piece of the holding body or in the rotational joint and leads to a movement of the protrusion in the retraction direction into the release position, whereby in the release position the protrusion of the locking element is arranged outside the U-shaped protruding part. As part of the method according to the invention, the U-shaped protruding part is moved out of the receptacle.

BRIEF DESCRIPTION OF THE DRAWINGS

In the following, the invention will be described by reference of figures that only show exemplary embodiments. In the figures.

DETAILED DESCRIPTION

Figure 1:
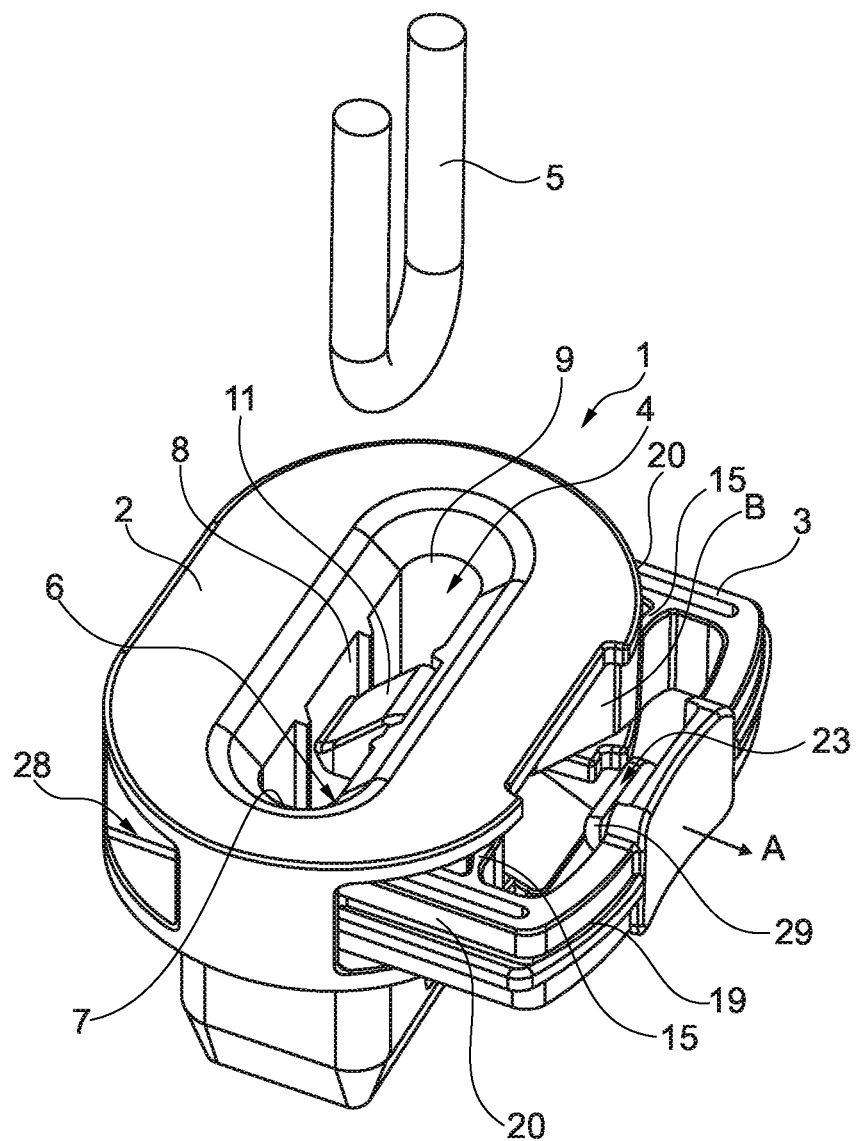
FIG. 1 shows a perspective view of the lock according to the invention.

FIG. 1 shows a lock 1 for holding a first part to a second part. The lock 1 comprises a holding body 2 and a locking element 3. The holding body 2 has a receptacle 4 for receiving a u-shaped protruding part 5 of the second part. The holding body having a wall 6 and further walls 7, 8, 9 and a bottom wall 10 that border the receptacle. The receptacle is a cul-de-sac.

The locking element 3 has a protrusion 11. The locking element 3 has a first position shown in FIG. 1, 2, 3. In the first position of the locking element 3, the protrusion 11 protrudes from the wall 6 into the receptacle 4 by a first amount. This position of the protrusion 11 is called the locking position.

Figure 4:
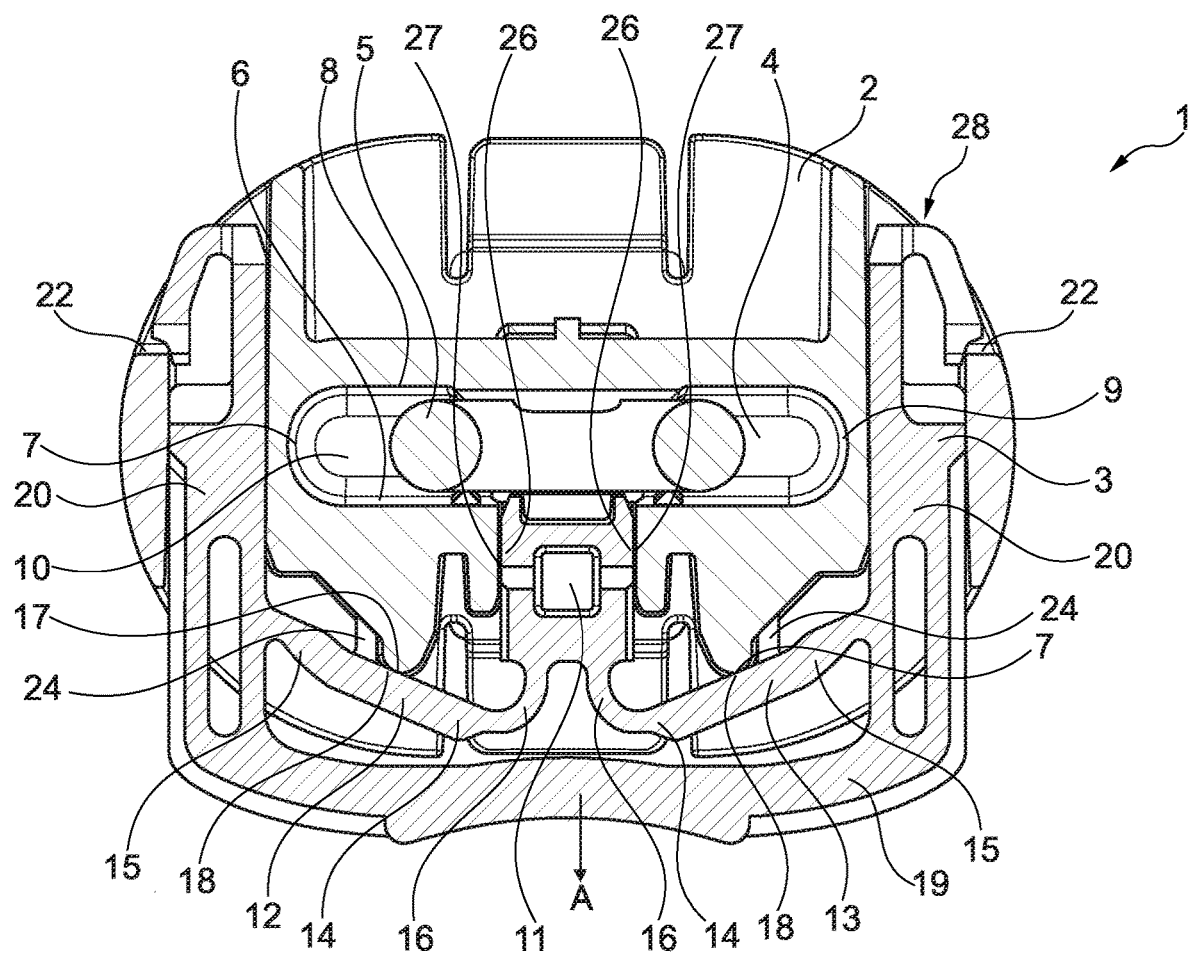
FIG. 4 shows a top view onto the sectional perspective view according to FIG. 2 with the protruding element being received in the receptacle and the protrusion being in the release position.

The locking element 3 has a second position (shown in FIG. 4). In the second position the protrusion 11 protrudes from the wall 6 into the receptacle 4 by a second amount, whereby the second amount is smaller than the first amount. This position of the protrusion 11 is called the release position.

In the locking position, the protrusion 11 is placed inside the u-shaped protruding part 5 and prevents the protruding part 5 to be retrieved (pulled out) from the receptacle 4. In the release position, the protrusion 11 is placed outside the u-shaped protruding part 5 and allows the protruding part 5 to be retrieved (pulled out) from the receptacle 4.

The protrusion 11 can be moved from the locking position to the release position in a retraction direction A relatively to the holding body 2.

The lock 1 has two levers (lever 12 and second lever 13). The lever 12 has a first end 14 and a second end 15 that is arranged opposite the first end 14. The protrusion 11 is attached to the first end 14 of the lever 12 via a hinge 16.

Figure 2:
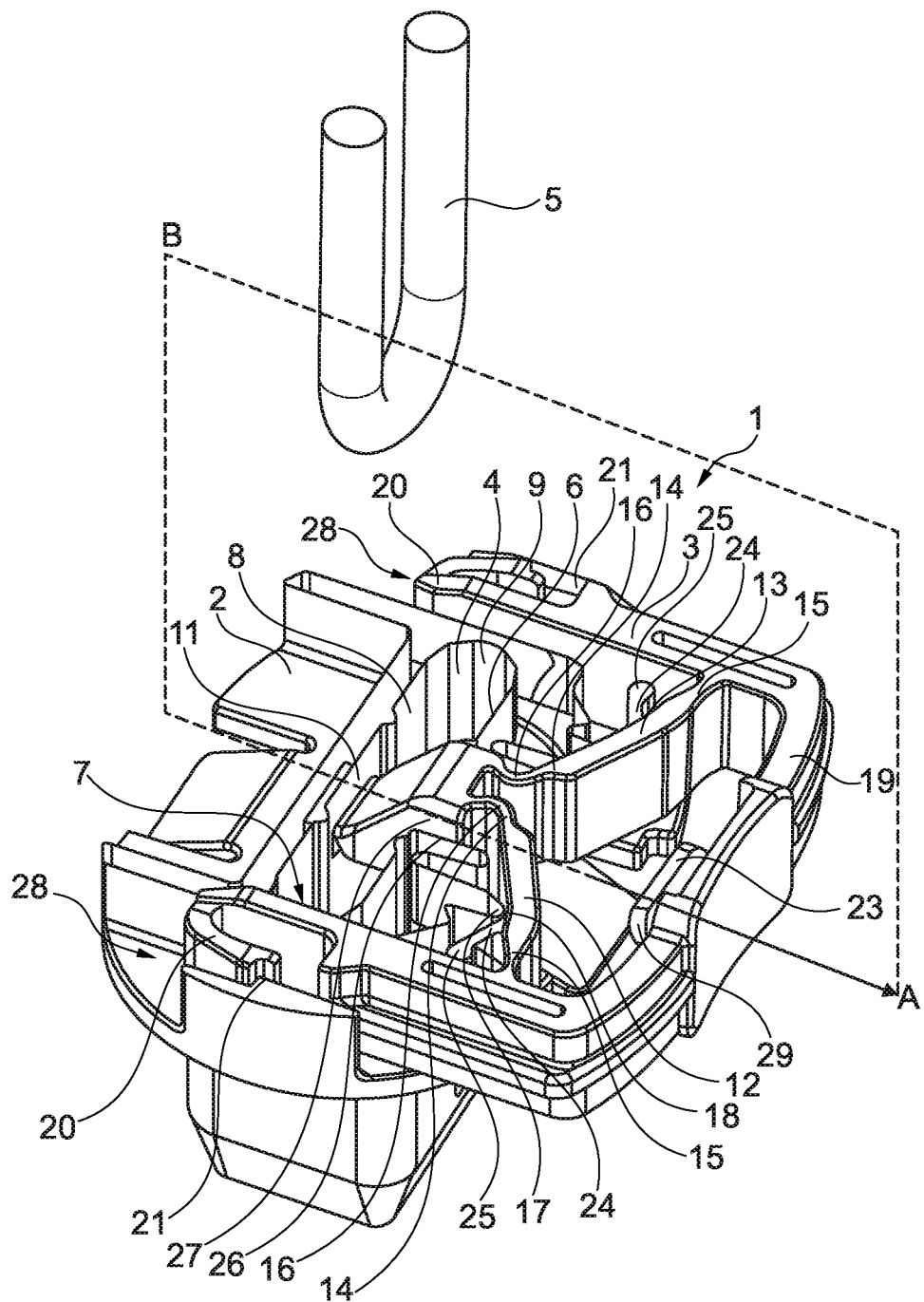
FIG. 2 shows a sectional perspective view onto the lock according to FIG. 1.

As seen in FIG. 2, 3, when the locking element 3 is in the first position, the lever 12 is in a position, where the lever 12 rests against a protruding piece 17 of the holding body 2 at a point of contact 18. When in contact with the protruding piece 17 the lever 12 can be swiveled about the protruding piece 17. The point of contact 18 is arranged between the first end 14 and the second end 15 of the lever 12.

The second lever 13 is designed and arranged mirror-symmetrical about a vertical plane B that dissects the protrusion 11 and contains the retraction direction A.

The second end 15 of the lever 12 and the second end 15 of the second lever 13 are connected by a bridge 19. The second end 15 of the lever 12 is attached to the bridge 19 by way of a hinge. The second end 15 of the second lever 13 is attached to the bridge 19 by way of a hinge.

A locking protrusion 20 that co-functions as a guide arm is connected to the second end 15 of the lever 12 by the same hinge. A locking protrusion 20 that co-functions as a guide arm is a part of the element that provides the bridge 19, namely that part of the element that provides the bridge 19 that extends beyond the point where the second end 15 of the lever 12 is connected to the bridge 19 by the hinge. The locking protrusion 20 can engage with a part 21 of the holding body 2 to hold the lever 12 in a predetermined swivel position.

Figure 3:
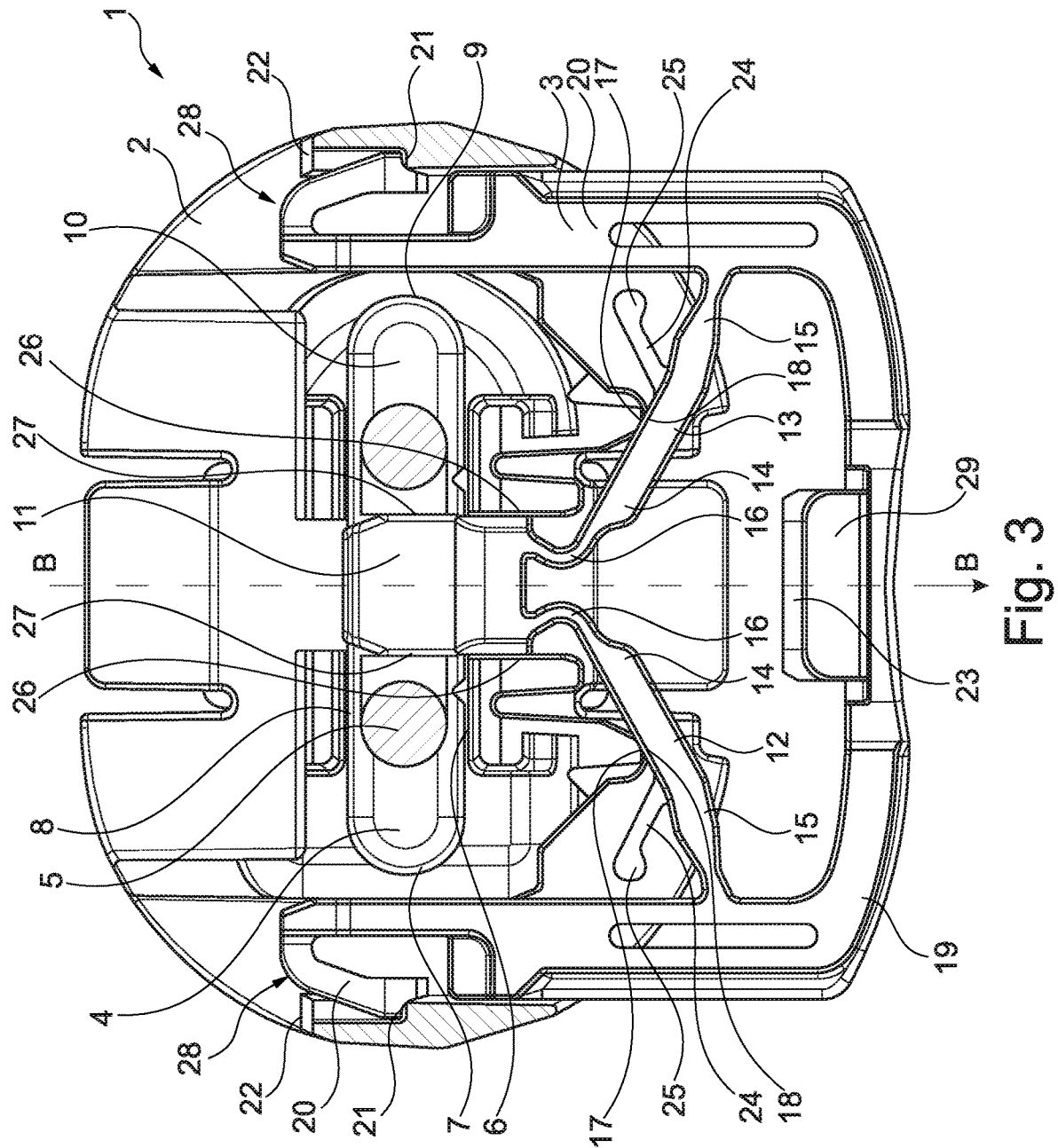
FIG. 3 shows a top view onto the sectional perspective view according to FIG. 2 with the protruding element being received in the receptacle and the protrusion being in the locking position.

In the FIGS. 2 and 3, the locking protrusion 20 engages with the part 21 and prevents the locking element from being pulled out of the holding body 2 further than shown in the FIGS. 2 and 3. If the bridge 19 and with the bridge 19 the locking protrusion 20 is pushed further into the holding body than shown in FIGS. 2 and 3, the locking protrusion 20 can come into engagement with part 22 and hold the bridge 19 in a more inward position. In this more inward position, the lever 12 will have swiveled about the protruding piece 17.

Starting from the first position of the locking element shown in FIG. 1, 2, 3, applying a force to the bridge 19 that is directed against the retraction direction A means applying a force to the second end 15 of the lever 12 that is directed against the retraction direction A. This application of force leads to a swivel movement of the lever 12 about the protruding piece 17 and a movement of the protrusion 11 in the retraction direction A. In doing so, the protrusion 11 could be moved from the locking position (FIG. 1, 2, 3) to the release position.

A spring leaf 29 is attached to the bridge 19. The spring leaf 29 has a free end 23. In the first position of the locking element 3 (FIG. 1, 2, 3) the free end 23 is distanced from a surface of the holding body 2. As the locking element 3 is moved from the first position toward the second position more inward into the holding body 2, the free end 23 first comes into contact with a surface of the holding body 2 and then upon further inward movement of the locking element 3, the spring leaf 29 is bent and thereby loaded.

A spring 24 is attached to the lever 12. The spring 24 has a free end 25. In the first position of the locking element 3 (FIG. 1, 2, 3) the free end 25 is distanced from a surface of the holding body 2. FIG. 4 is a sectional view taking at a slightly higher plane and shows the free end 25 of the spring 24 have passed below a wall. As the locking element 3 is moved from the first position toward the second position more inward into the holding body 2, the free end 25 first comes into contact with a surface of the holding body 2 and then upon further inward movement of the locking element 3, the spring 14 is bent and thereby loaded.

The holding body 2 is provided with a guide surface 26. A surface 27 of the protrusion 11 interacts with the guide surface 26 such that the protrusion 11 is guided to move from the locking position to the release position in the retraction direction A. The holding body has several guide surfaces 26. At least one guide surface 26 to the right of the protrusion 11 in the view of FIG. 3 and one guide surface 26 to the left of the protrusion 11 in the view of FIG. 3. Further guide surfaces may be provided below and above the protrusion in the view of FIG. 3.

The guide arm that is provided by the locking protrusion 20 is arranged in a channel 28 in the holding body 2 and can be moved along the channel 28, thereby guiding the movement of the second end 15 of the lever 12 and the bridge 19.

In a method for disassembly and starting from the first position of the locking element 3 as shown in FIG. 1, 2, 3
    a force is applied to the second end 15 that is directed against the retraction direction A, which leads to a swivel movement of the lever 12 about the protruding piece or in the rotational joint and a movement of the protrusion 11 in the retraction direction A into the second position (FIG. 4), whereby in the second position the protrusion 11 is in a release position, whereby in the release position
        the protrusion 11 either protrudes from the wall 6 into the receptacle by a second amount, whereby the second amount is smaller than the first amount,
        or the protrusion 11 does not protrude from the wall 6, and the u-shaped protruding part 5 is moved out of the receptacle 4.

Figure 5:
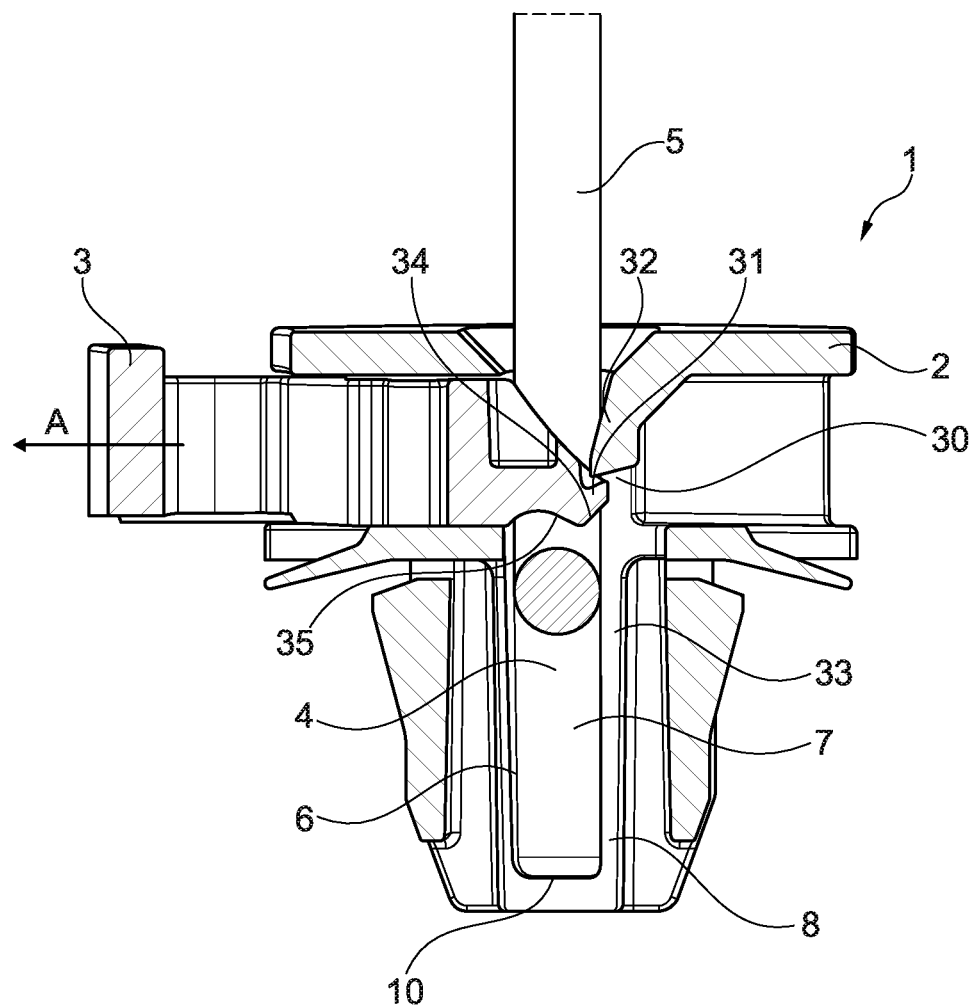
FIG. 5 shows a partially sectional view to the lock of FIG. 3. with the tip of the protrusion engaging a recess on a wall opposite the first wall.

FIG. 5 shows that the holding body 2 has a first wall 6 that borders the receptacle 4, whereby in the locking position the protrusion 11 protrudes from the first wall 6 into the receptacle 4 by a first amount and whereby in the release position the protrusion 11 protrudes from the first wall 6 into the receptacle 4 by a second amount, whereby the second amount is smaller than the first amount, whereby the holding body 2 has a second wall 8 that borders the receptacle 4, whereby the second wall 8 is arranged opposite the first wall 6 and whereby the second wall 8 has a recess 30, whereby the protrusion 11 has a tip 31, whereby the protrusion 11 can be brought into a position (shown in FIG. 5), where the tip 31 of the protrusion 11 engages the recess 30 in the second wall 8. The tip 31 of the protrusion 11 preferably engages the recess 30 in the second wall 8 when the protrusion 11 is in the locking position. The recess 30 is provided by way of a section 32 of the second wall 8 protruding towards the first wall 6 over other sections 33 of the second wall 8.

FIG. 5 shows that he wedge shaped protrusion 11 can have a push back surface 34 at its underside that can come into contact with the protruding part 5 as the protruding part 5 is moved upwards and if the protrusion 11 is in the release position or close to the release position. If for example the protrusion 11 has been moved from the locking position (shown in FIG. 59 towards the release position and has either reached the release position or is close to the release position and in this position is in the way of the protruding element 5, the push back surface 34 of the protrusion 11 can lead to the protruding part 5 pushing the protrusion 11 further into the release direction A when the protruding part 5 contacts the push back surface 34 of the wedge shaped protrusion 11.

FIG. 5 shows that the protrusion 11 can have a pull out surface 35 at its underside that is pointing towards the first wall 6 and is arranged at an angle to the release direction A, whereby the pull out surface 35 can come into contact with the protruding part 5 as the protruding part 5 is moved upwards and if the protrusion 11 is in the locking position (FIG. 5) or close to the locking position. If for example the protrusion 11 is in the locking position (FIG. 5) or close to the locking position and in this position is in the way of the protruding element 5, the pull out surface 35 can lead to the protruding part 5 pulling the protrusion 11 further away from the wall 6 and against the release direction A when the protruding part contacts the pull out surface 35.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A lock for holding a first part to a second part, the lock comprising:

a holding body configured to be mounted to the first part, the holding body configured with a receptacle for receiving a protruding part of the second part, the holding body having a wall that borders the receptacle, a linearly moveable locking element, the locking element having a protrusion, wherein the locking element is moveable to a first position, whereby in the first position the locking protrusion is in a locking position, whereby in the locking position the protrusion protrudes from the wall into the receptacle by a first amount, such that the protrusion can retain the protruding part within the receptacle, and the locking element is moveable to a second position, whereby in the second position the protrusion is in a release position, whereby in the release position:

the protrusion either protrudes from the wall into the receptacle by a second amount, whereby the second amount is smaller than the first amount, or the protrusion does not protrude from the wall into the receptacle, such that the protruding part can be moved into and released from the receptacle, wherein when the protrusion is moved from the locking position to the release position the protrusion moves in a retraction direction relative to the holding body, and a pair of levers, whereby, for at least one of the pair of levers:

the lever has a first end and a second end that is arranged opposite the first end, whereby the protrusion is attached to the first end of the lever, and the lever is or can be moved into a position, where the lever rests against a a protruding piece of the holding body at a point of contact, and when in contact with the protrusion the lever can be swiveled about the protruding piece or the lever is connected to the holding body by a rotational joint, whereby the point of contact or the rotational joint is arranged between the first end and the second end of the lever, and applying a force to the second end that is directed against the retraction direction leads to:
a swivel movement of the lever about the protruding piece or in the rotational joint, and
a movement of the protrusion in the retraction direction.

2. The lock according to claim 1, wherein the pair of levers further comprising a second lever, whereby
the second lever has a first end and a second end that is arranged opposite the first end, whereby the protrusion is attached to the first end of the lever and the first end of the second lever, and
the second lever is or can be moved into a position, where the second lever rests against a second protruding piece of the holding body at a point of contact, and when in contact with the second protruding piece can be swiveled about the second protruding piece or the second lever is connected to the holding body by a second rotational joint, whereby the point of contact or the second rotational joint is arranged between the first end and the second end of the second lever, and
applying a force to the second end of the second lever that is directed against the retraction direction leads to:
a swivel movement of the second lever about the second protruding piece or in the second rotational joint, and
a movement of the protrusion in the retraction direction.

3. The lock according to claim 2, further comprising a bridge that connects the second end of the lever with the second end of the second lever.

4. The lock according to claim 1, further comprising a guide surface, whereby a surface of the protrusion and/or a surface of a part of the locking element that is fixedly connected to the protrusion interacts with the guide surface such that the protrusion is guided to move from the locking position to the release position in the retraction direction.

5. The lock according to claim 1, wherein a locking protrusion is arranged at the second end of the lever, whereby the locking protrusion can releasably engage with a part of the holding body to hold the lever in a predetermined swivel position.

6. The lock according to claim 1, wherein a guide arm is arranged at the second end of the lever, whereby the guide arm is arranged in a channel in the holding body and can be moved along the channel, thereby guiding the movement of the second end of the lever.

7. The lock according to claim 6, wherein the second end of the lever is connected to the locking protrusion and/or the guide arm by a hinge.

8. The lock according to claim 1, wherein the first end of the lever is connected to the protrusion by a hinge.

9. An assembly of a first part and a second part, whereby the first part is connected to the holding body of the lock according to claim 1,
the second part comprises a protruding part with an opening or a recess, whereby
the protruding part is arranged in the receptacle, and
the protrusion of the locking element is in the first position and at least partially arranged inside protruding part.

10. A method for disassembly of the assembly according to claim 9, wherein
a force is applied to the second end that is directed against the retraction direction, which leads to a swivel movement of the lever about the protruding piece or in the rotational joint and a movement of the protrusion in the retraction direction into the second position the protrusion is in a release position, whereby in the release position:
the protrusion either protrudes from the wall into the receptacle by a second amount, whereby the second amount is smaller than the first amount, or
the protrusion does not protrude from the wall, and
the u-shaped protruding part is moved out of the receptacle.

* * * * *